United States Patent [19]

Eldumiati et al.

[11] Patent Number: 4,525,776
[45] Date of Patent: Jun. 25, 1985

[54] ARITHMETIC LOGIC UNIT ARRANGED FOR MANIPULATING BITS

[75] Inventors: Ismail I. Eldumiati, Holmdel; Michael K. Maul, Whitehouse Station, both of N.J.

[73] Assignee: Bell Telephone Laboratories, Incorporated, Murray Hill, N.J.

[21] Appl. No.: 155,317

[22] Filed: Jun. 2, 1980

[51] Int. Cl.³ .................... G06F 7/00; G06F 15/20
[52] U.S. Cl. .................................................. 364/200
[58] Field of Search ... 364/200 MS File, 900 MS File

[56] References Cited

U.S. PATENT DOCUMENTS 3,982,229  9/1976  Rouse et al. ............... 364/200
4,194,241  3/1980  Mager ......................... 364/200

OTHER PUBLICATIONS

Standard Dictionary of Computers and Information Processing; Martin H. Weik, Hayden Book Company Inc.

Primary Examiner—Gareth D. Shaw
Assistant Examiner—John M. Mills
Attorney, Agent, or Firm—Richard B. Havill

[57] ABSTRACT

A digital computer is arranged to process data through an arithmetic logic unit in response to instructions residing sequentially in an instruction register, each instruction requiring a single instruction interval for fetching data from a selected source in a store, processing the data in the arithmetic logic unit, and storing the result of processing the data into a selected destination in the store. Means are provided for moving a single bit from any selected one of a plurality of bit positions in the selected source to any selected bit position of a plurality of bit positions in the selected destination during a single instruction interval without affecting the state of any other bit of the selected destination.

8 Claims, 8 Drawing Figures

FIG. 8

TABLE I—CONTROL SIGNALS

| INSTRUCTION | INPUTS | | | | OUTPUTS | |
|---|---|---|---|---|---|---|
| | SB | $\overline{CB}$ | $\overline{MB}$ | $\overline{BS}$ | GC | HC |
| REG ALU OPRN | 0 | 1 | 1 | X | 0 | 1 |
| SET BIT | 1 | 1 | 1 | X | 0 | 0 |
| CLEAR BIT | 0 | 0 | 1 | X | 1 | 1 |
| MOVE BIT | 0 | 1 | 0 | 1 | 1 | 1 |
| MOVE BIT | 0 | 1 | 0 | 0 | 1 | 0 |

TABLE II  REGISTER-DECODER H
(SET BIT)

| INPUTS | | | OUTPUTS | | | |
|---|---|---|---|---|---|---|
| HC | N1 | N0 | H3 | H2 | H1 | H0 |
| 1 | X | X | 0 | 0 | 0 | 0 |
| 0 | 0 | 0 | 0 | 0 | 0 | 1 |
| 0 | 0 | 1 | 0 | 0 | 1 | 0 |
| 0 | 1 | 0 | 0 | 1 | 0 | 0 |
| 0 | 1 | 1 | 1 | 0 | 0 | 0 |

TABLE III  REGISTER-DECODER G
(CLEAR BIT)

| INPUTS | | | OUTPUTS | | | |
|---|---|---|---|---|---|---|
| GC | N1 | N0 | G3 | G2 | G1 | G0 |
| 0 | X | X | 1 | 1 | 1 | 1 |
| 1 | 0 | 0 | 1 | 1 | 1 | 0 |
| 1 | 0 | 1 | 1 | 1 | 0 | 1 |
| 1 | 1 | 0 | 1 | 0 | 1 | 1 |
| 1 | 1 | 1 | 0 | 1 | 1 | 1 |

ARITHMETIC LOGIC UNIT ARRANGED FOR MANIPULATING BITS

The invention relates to an arithmetic logic unit that is more particularly described as an arithmetic logic unit arranged for manipulating a single bit.

BACKGROUND OF THE INVENTION

In the prior art, a microcomputer has been arranged for performing bit manipulations, such as clearing a selected bit or setting a selected bit in a word. Additionally by way of example, a bit can be moved from any bit position in a source word to any bit position in a destination word.

During the move bit operation, the arithmetic logic unit performs a test on the selected bit in the source word. This test procedure includes the generation of a test mask before performing the test. Depending upon the outcome of the test, a selected bit position in the destination either will be cleared or set. Other bits in the destination remain unchanged. This move bit operation requires two or more instructions and therefore two or more instruction intervals to move a single bit.

Thus when a programmer desires to move a bit during a single instruction interval, a problem arises because plural instructions are used for completing the move. Moving a bit in a single instruction interval is a valuable feature for a microcomputer designed into a control arrangement that performs many bit manipulation operations.

SUMMARY OF THE INVENTION

The problem is solved by a digital computer arranged to process data through an arithmetic logic unit in response to instructions residing sequentially in an instruction register, each instruction requiring a single instruction interval for fetching data from a selected source in a store, processing the data in the arithmetic logic unit, and storing the result of processing the data into a selected destination in the store. Means are provided for moving a single bit from any selected one of a plurality of bit positions in the selected source to any selected bit position of a plurality of bit positions in the selected destination during a single instruction interval without affecting the state of any other bit of the selected destination.

BRIEF DESCRIPTION OF THE DRAWING

A better understanding of the invention may be derived by reading the following detailed description of an embodiment thereof with reference to the attached drawings wherein

FIG. 8 shows logic tables for the move bit control circuit.

DETAILED DESCRIPTION

Figure 1:
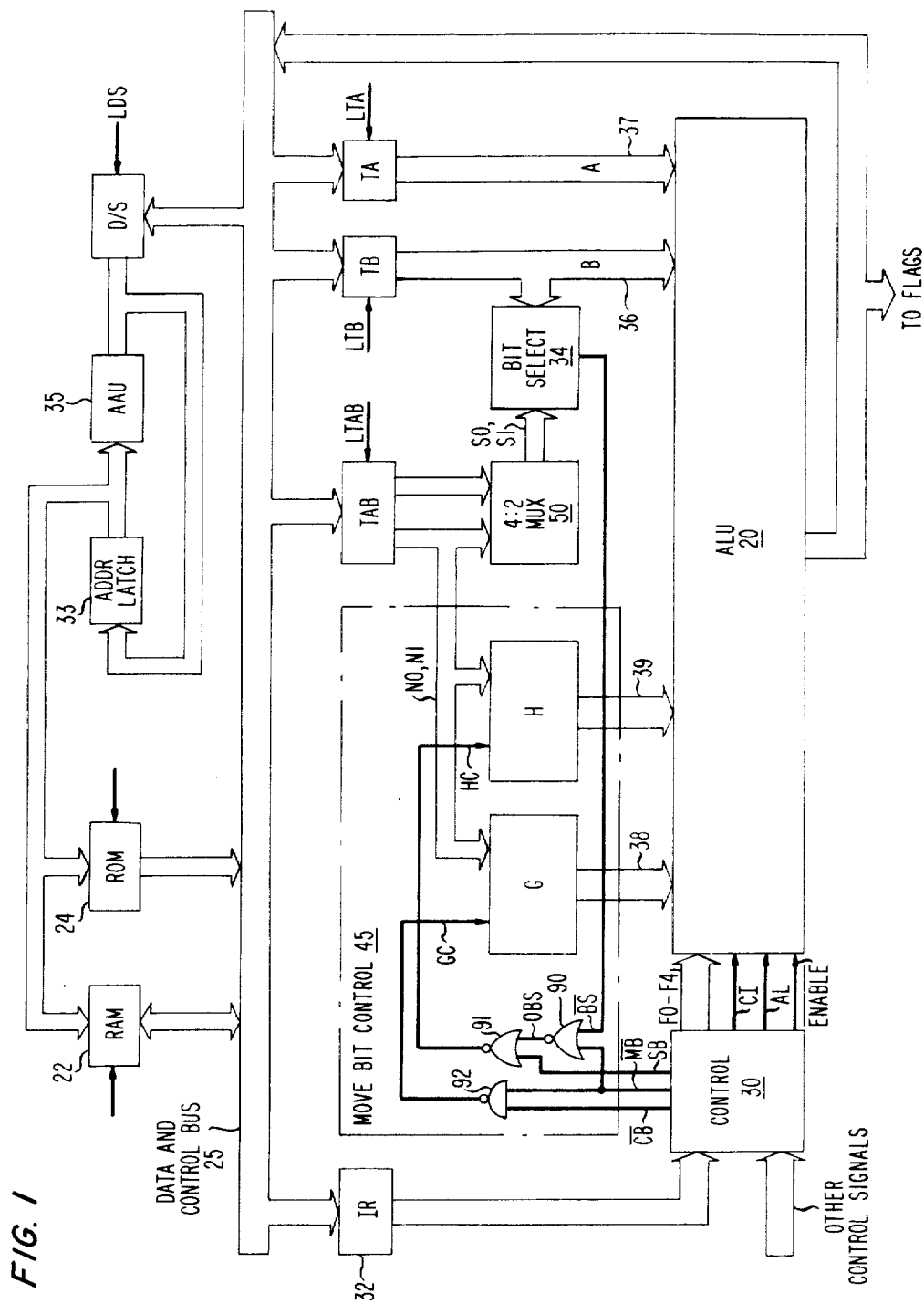
FIG. 1 is a block diagram of a digital computer arrangement.
Figure 2:
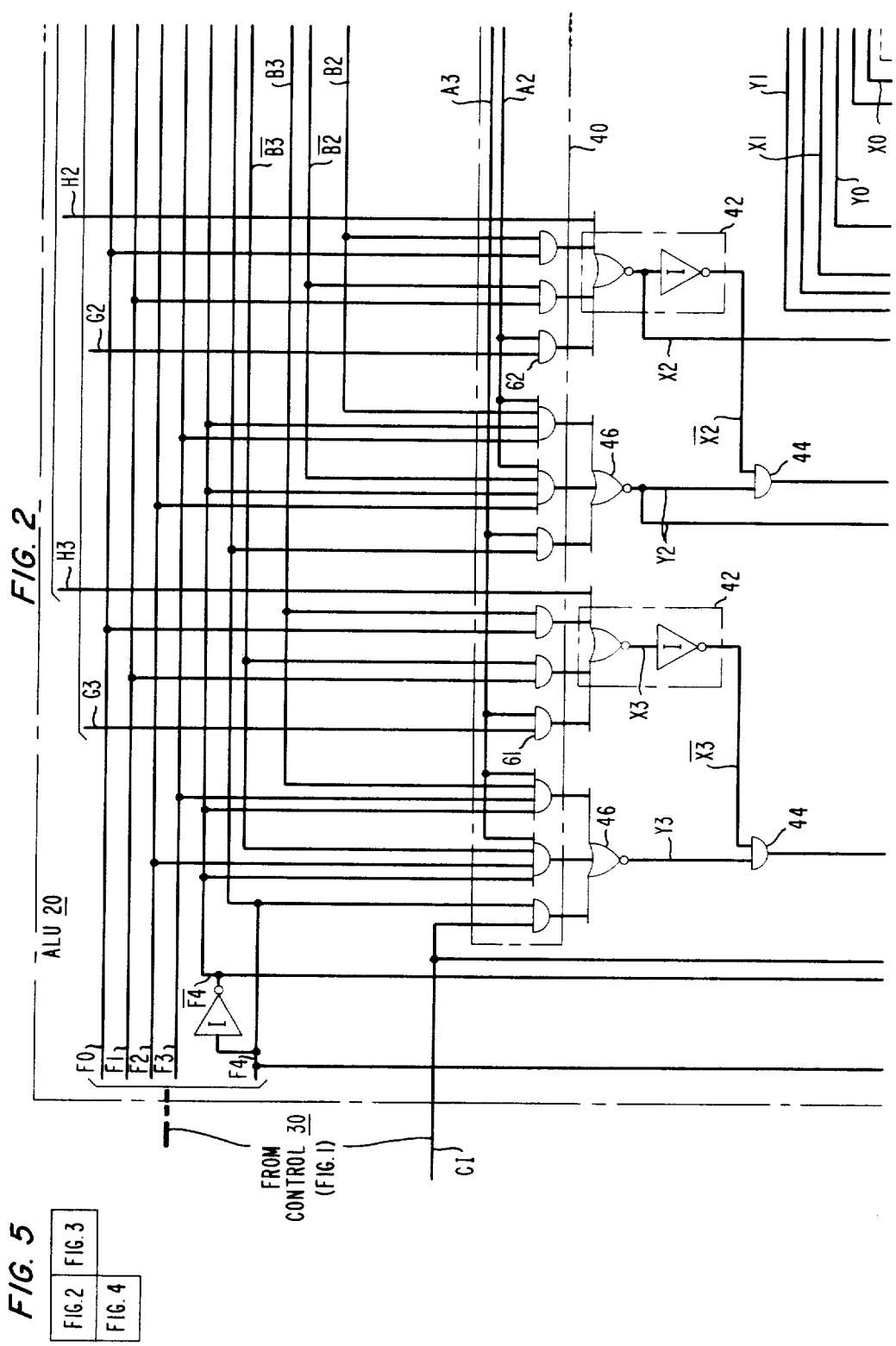
FIGS. 2, 3 and 4, when positioned in accordance with FIG. 5, form a logic schematic of an arithmetic logic unit.
Figure 3:
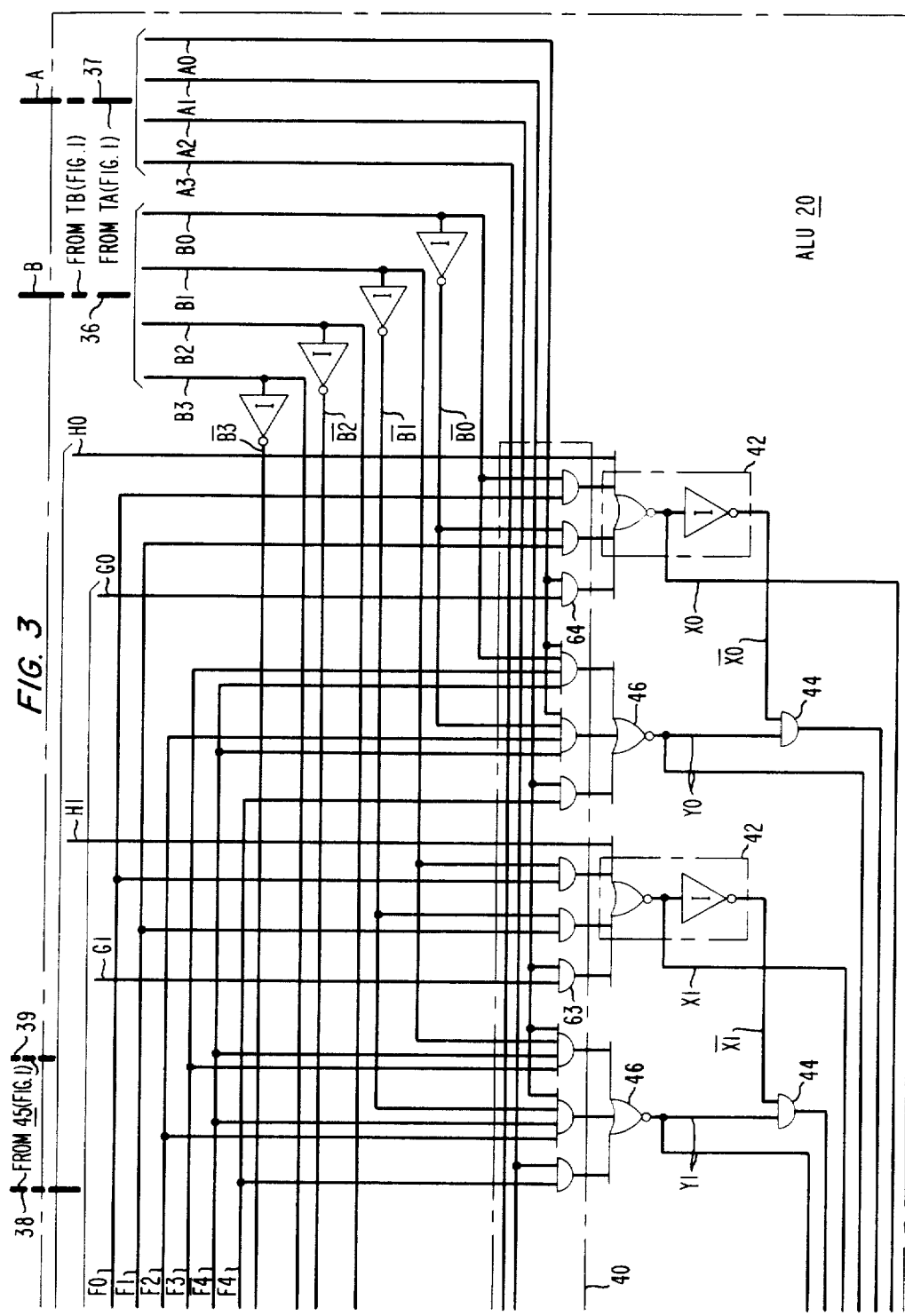
Figure 4:
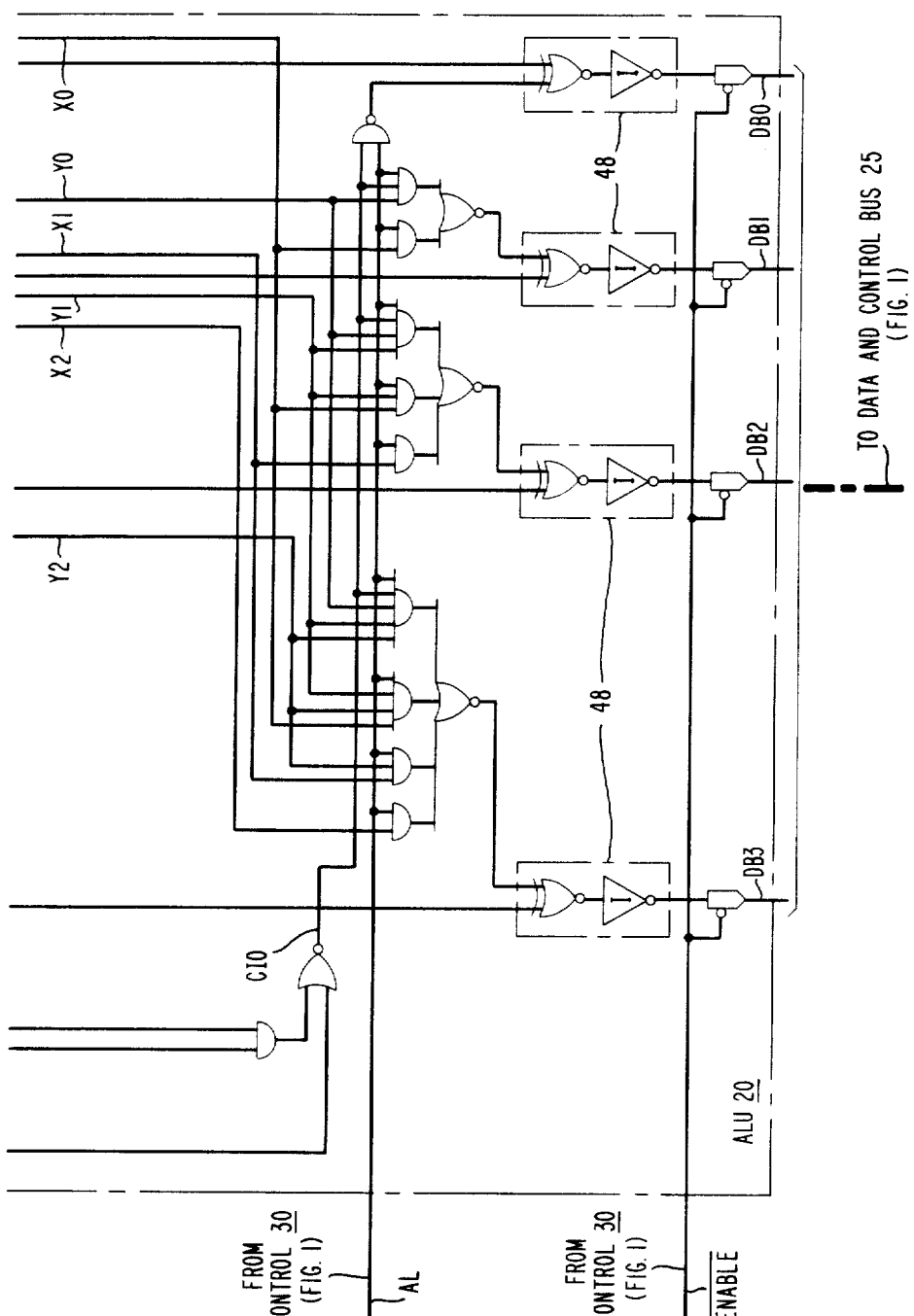

Referring now to FIG. 1, there is shown the architecture of a digital microcomputer including an arithmetic logic unit (ALU) 20 arranged to receive inputs from several circuits. Data fetched from random access memory (RAM) 22, read only memory (ROM) 24 or other sources by way of a data and control bus 25 are held temporarily in data registers TA and TB as inputs of the ALU. Decoded control signals from the ROM 24 are transferred by way of the bus 25, a register TAB and controlled register-decoders G and H to inputs of the ALU. Data registers TA and TB and controlled register-decoders G and H all store 4-bits which are supplied to the ALU. The outputs of the registers TA and TB and of the controlled register-decoder G are all applied to a level of AND gates in the ALU 20, as shown in FIGS. 2, 3 and 4. The outputs of the controlled register-decoder H are applied to a level of OR gates in the ALU, also shown in FIGS. 2, 3 and 4. When the inputs to the ALU are stored in the respective registers and the ALU is turned on to generate an output set of signals, that output set of signals depends upon the input words in registers TA and TB together with control signals being applied from a control circuit 30 and the controlled register-decoders G and H. Otherwise the ALU 20 is similar to other known ALU circuit arrangements, which do not incorporate any memory for multiple executions resulting from a single instruction.

As shown in FIG. 1, controlled register-decoders G and H receive control signals GC and HC, respectively. These control signals GC and HC are functions of a control field set of signals SB, $\overline{CB}$, and $\overline{MB}$, which determines whether the arithmetic logic unit is to perform a regular operation, a set bit operation, a clear bit operation, or a move bit operation. Signals SB, $\overline{CB}$, and $\overline{MB}$ are generated by the control circuit 30 in response to instructions stored in an instruction register (IR) 32 and other signals. The control signal HC also is a function of an inverted bit selected signal $\overline{BS}$ which represents the binary value of the bit selected to be moved during a move bit operation. Signal $\overline{BS}$ is generated by a bit selection circuit 34 in response to testing of the bit to be moved. When the selected bit is a one, signal $\overline{BS}$ is a zero and vice versa.

For any move bit operation, four bits are placed in the register TAB for defining a bit position in the destination word and a bit position in the source word. Two bits, or signals, designated N1 and N0, define the bit position affected in the destination word. The other two bits, designated S1 and S0, define the bit position of the bit to be moved from the source word.

For any set bit or clear bit operation, the two bits N1 and N0 are placed in the register TAB for defining a bit position in the destination word. No source word information is required.

During regular ALU operations, i.e., when the ALU is not performing a set bit, a clear bit, or a move bit operation, outputs from the controlled register-decoders G and H have no effect on the output of the ALU.

REGULAR ALU OPERATION

Figure 6:
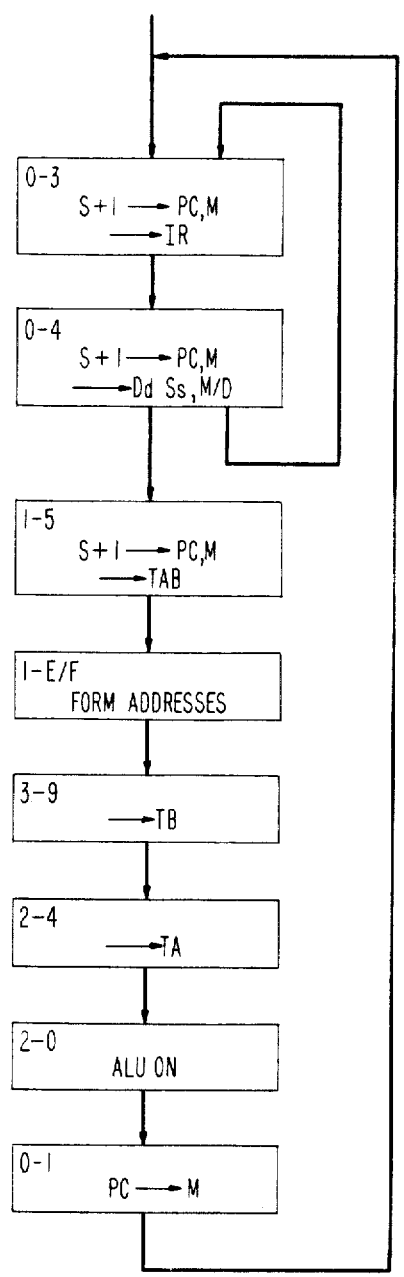
FIG. 6 is a sequence chart.

Referring now to FIG. 6, the sequence chart, or state diagram, shows states which occur during operation of the arithmetic logic unit 20 of FIG. 1 together with associated circuitry of the microcomputer. Although several states are shown in FIG. 6, the diagram represents only a portion of a larger state diagram. The portion shown includes a part which illustrates operation of the microcomputer and the ALU as a result of some regular instructions together with clear bit, set bit and move bit instructions.

Each instruction includes a sequence of states starting at the top of the diagram and stepping one state at a time down through successive states to the bottom of the diagram. With respect to the states, each has an associated identifying number located in the upper lefthand corner of the rectangle representing the state. A more complete description of the operation of the control circuit with respect to the states is presented with similar designator numbers in a U.S. Pat. No. 4,346,437, which issued Aug. 24, 1982 in the names of D. E. Blahut and R. L. Ukeiley.

In FIG. 6, the uppermost state 0-3 is the initial, or starting, state for all instructions. The state 0-1 at the bottom of the diagram is the final, or last, state from which the sequence of states returns to the initial state 0-3. During state 0-3, a single four-bit opcode is fetched from ROM 24 by way of bus 25 and is stored in the instruction register 32 providing as many as sixteen different instructions. This is represented in the state diagram by a symbol →IR. Regular instructions are represented by hexadecimal numbers 0 through 8. After the opcode is fetched into the instruction register and an address in the slaves of address latches 33 is incremented in an address arithmetic unit 35, the new address is stored in the program counter and in masters of the address latches. The control circuit 30 steps to state 0-4.

Some states described in the Blahut et al patent are not essential to the operations described herein and are omitted from the state diagram of FIG. 6 in order to clearly describe the important steps of the instant operations.

In state 0-4 a second word of the instruction is fetched from ROM 24 into a register D/S, as indicated by the expression →DdSs. Again the address in the slaves of the address latches 33 is incremented in the address arithmetic unit and is stored in the program counter and in masters of the address latches 33. The state steps on to state 1-5 initiating an instruction interval.

The sequence is forced to state 1-5 because the first opcode word representing a regular ALU operation is within the bounds defined by hexadecimal numerals 0 and C. During state 1-5, a data word is fetched from memory 22 or 24 through the data and control bus 25 into register TAB. This operation is represented in the state diagram by a symbol →TAB. The machine then steps to state 1-E/F.

In state 1-E/F the microcomputer forms addresses for accessing the destination and the source. Although more than one state may be required to form the addresses, state 1-E/F is considered to be representative of the entire address formation process. A more complete description of the process for forming addresses is presented in the previously mentioned Blahut et al patent. The sequence of states then steps to state 3-9.

Figure 7:
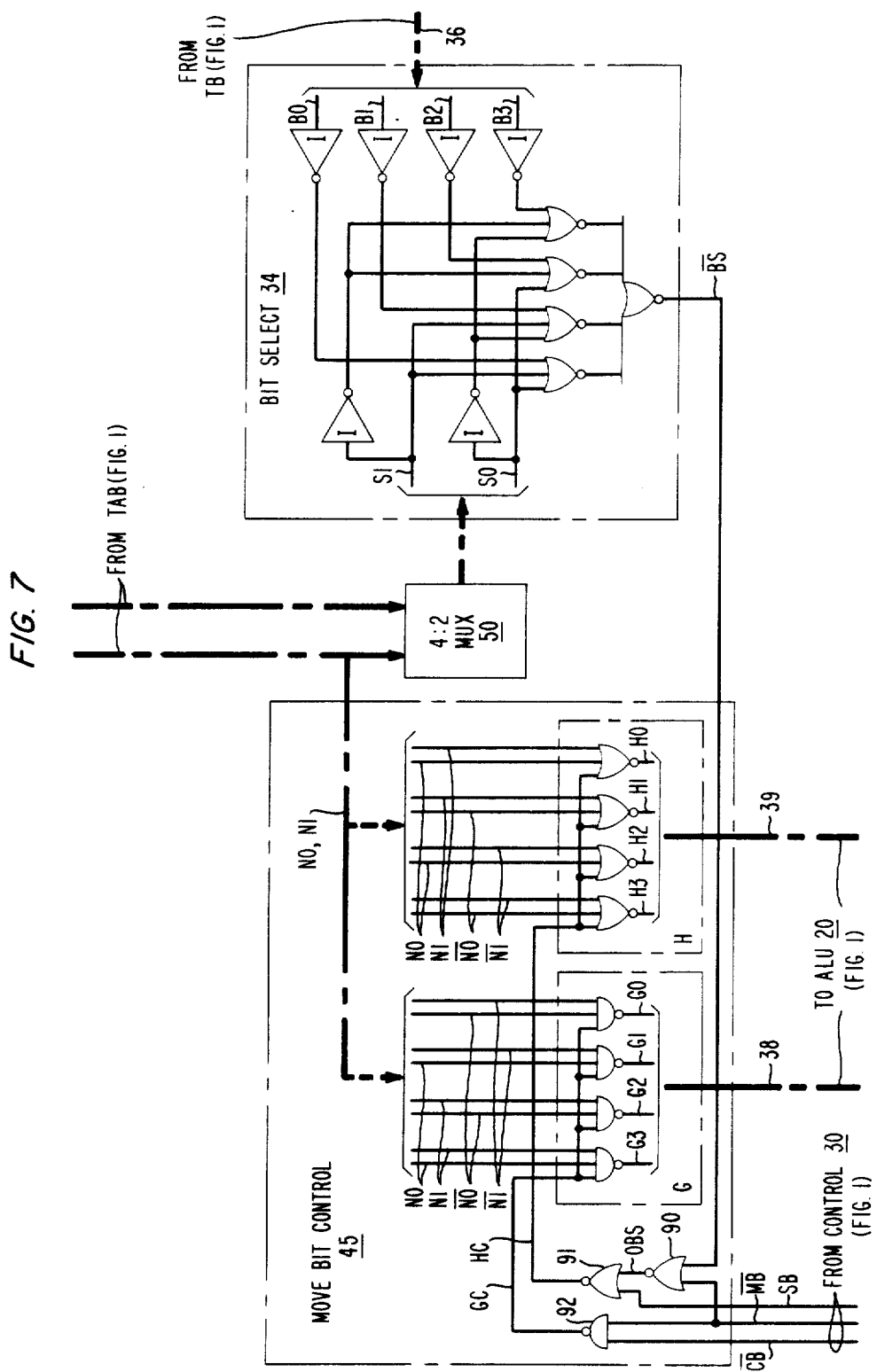
FIG. 7 is a logic schematic of a move bit control circuit, a multiplexer, and a selection circuit.

During state 3-9, a source word is fetched from memory 22 or 24 into register TB. This is represented by the symbol →TB. As a result of storing the source word in register TB, that word is applied directly through a bus 36 in FIG. 1 to the inputs B0, B1, B2 and B3 of the ALU and similarly designated inputs to the bit selection circuit 34. Details of the bit selection circuit 34 are shown in FIG. 7. During the regular ALU operations, the inputs B0-B3 to the ALU may be used but those inputs to the bit selection circuit 34 are not used. The sequence steps to state 2-4.

In state 2-4 a destination word is fetched from memory into the register TA. This is represented in FIG. 5 by the symbol →TA. As a result of storing the destination word in the register TA, the destination word is applied directly through a bus 37 in FIG. 1 to the inputs A0, A1, A2 and A3 of the ALU.

Control signals are established and are applied to a move bit control circuit 45 of FIGS. 1 and 7. As shown in FIG. 7, the controlled register-decoder G is a combination of NAND gates arranged to produce all ones when signal GC is zero and one and only one zero when signal GC is a one. Controlled register-decoder H is a combination of NOR gates that produce all zeros when signal HC is a one and only a single one when signal HC is a zero.

As is shown in FIG. 8, the states of the controlled register-decoders G and H and of the control signals GC and HC for all regular ALU operations are defined in the top rows of TABLES I, II and III. For any regular ALU operation, the control signal GC is a zero and all of the output signals from the controlled register-decoder G are ones. Since these output signals, called a clear bit group of signals, G0, G1, G2 and G3, are all ones and are applied directly by way of similarly labelled leads in a bus 38 to specific inputs of the level of AND gates 40 within the ALU 20 of FIGS. 2, 3 and 4, the output signals from the controlled register-decoder G do not affect the outputs of those AND gates. This is so because the other inputs of those AND gates, such as A0, A1, A2 and A3, determine their outputs, which are applied as one set of inputs to each of four gates in the level of OR gates 42 in the ALU 20 of FIGS. 2, 3 and 4 for regular ALU operations.

Additionally for a regular ALU operation, the control signal HC is a one and all of the output signals from the register-decoder H are zeros. Since these output signals, H0, H1, H2 and H3, called a set bit group of signals, are all equal to zero and are applied directly by way of similarly labelled leads to other inputs of the level of OR gates 42 within the ALU 20 of FIGS. 2 and 3, the output signals from the register-decoder H do not affect the outputs of those OR gates. Additional inputs of the OR gates 42, such as the inputs received from the level of AND gates 40, determine the outputs of the level of OR gates 42 for regular ALU operations.

The microcomputer now is prepared to turn on the ALU, and the sequence steps to state 2-0 of FIG. 6. During state 2-0 the arithmetic logic unit 20 is turned on to perform the prescribed regular ALU operation. The operation being completed, the ALU produces a destination word that is transmitted over the data and control bus 25 to the destination in RAM 22 where it is written. Thus the instruction interval is ended.

The sequence steps to state 0-1 wherein the address stored in the program counter is transferred to the masters of the address latches 33 of FIG. 1, as represented by the symbol PC→M. As a result the sequence then steps to state 0-3 which is the initial state for the subsequent instruction.

SET BIT OPERATION (REGISTER-DECODER H)

Consider now that a set bit operation is being performed rather than a regular ALU operation. For the set bit operation, the appropriate opcode, represented by hexadecimal numeral 9, is fetched from ROM 24 through the bus 25 during state 0-3 and is stored in the instruction register 32. The control circuit 30 steps from state 0-3 through states 0-4 and 1-5 initiating the instruction interval and putting one word of data in register D/S and another in register TAB. The data word stored in register TAB includes an order field of bits N1 and N0 defining the order of the bit to be set in the destination. Thereafter in state 1-E/F, an address for the destination is formed from address mode information currently stored in register D/S. The machine steps through state 3-9 and then the destination word is fetched and stored in register TA during state 2-4.

Now the microcomputer is prepared for the set bit operation, and the arithmetic logic unit 20 is turned on to perform a single operation. The destination word in register TA is positioned to have a bit in the position, defined by the order field of bits N1 and N0, set if it is not already a one.

Accordingly, control signals are established and are applied to the move bit control circuit 45 of FIGS. 1 and 7. Control signals for the set bit operation are presented in the second row of TABLE I in FIG. 8. During the set bit operation, set bit control signal SB is a one insuring that the control signal HC, produced by a NOR gate 91, is a zero. Inverted clear bit control signal $\overline{CB}$ and inverted move bit signal $\overline{MB}$ are ones insuring that the control signal GC, produced by a NAND gate 92, is a zero. Therefore for the set bit operation, both of the control signals HC and GC are zeros.

Because the control signal GC is a zero for the set bit operation, all of the clear bit group of signals G0, G1, G2 and G3 from the NAND gates of the controlled register-decoder G are ones regardless of what bit is being selected, as shown in the top row of TABLE III of FIG. 8. In accordance with a similar array of the clear bit group of signals for regular ALU operations, these signals have no affect on the output of the level of AND gates 40 in the ALU.

It is noted that because its output has no affect on set bit operations, the controlled register-decoder G is not needed for a computer which is performing set bit operations but no clear bit nor move bit operations.

Because control signal HC equals zero for the set bit operation, the binary value of the order field of bits N1 and N0 defines which bit is to be set in the destination word. This relationship is shown in the four lower rows of TABLE II in FIG. 8. The NOR gates of the controlled register-decoder H convert the applied binary value into a one-out-of-four code in the set bit group of signals H0, H1, H2 and H3. In that code one and only one of the four signals H0, H1, H2 and H3 is a one, and the other three are zeros for each of the binary values. The bit to be set, as defined by the binary code of the order field of bits N1 and N0, is the one.

As shown in FIGS. 2, 3 and 4, several gates 61, 62, 63 and 64 of the level of AND gates 40 in the ALU 20 respond to the word stored in register TA and to the clear bit group of signals of the register-decoder G. For the set bit operation, the contents of register TB do not affect the output of the ALU. Also, since the clear bit group of signals is all ones, gates 61, 62, 63 and 64 of the level of AND gates 40 produce outputs determined by their inputs from the register TA.

Since the set bit group of signals from the register-decoder H are applied through bus 39 to the level of OR gates 42 in the arithmetic logic unit, as shown in FIGS. 2, 3 and 4, along with the contents of the register TA as reproduced by the gates 61, 62, 63 and 64 in the level of AND gates 40, the single one in the set bit group of signals assures that the output of the OR gate to which that one is applied will be a one. This overrides whatever input is applied from the associated AND gate 61, 62, 63 or 64. The three zeros in the set bit group of signals applied from the register-decoder H do not affect the output of their respective OR gates. Other AND gates having outputs applied to the OR gates 42 are for regular ALU operations and produce zero output at this time. Thus the output of the level of OR gates 42 is the destination word from the register TA except that the selected bit is a one whether or not it was a one when originally stored in register TA.

The outputs of the gates of the level of OR gates 42 are applied as inputs $\overline{X}i$, where i is a number between 0 and 3, to another level of AND gates 44 together with inputs Yi from a level of NOR gates 46. For the set bit operation, these inputs Yi are all ones causing the AND gates 44 to produce outputs which are the same as the inputs $\overline{X}i$. The outputs of those AND gates 44 are applied as inputs to EXCL OR gates 48. The bit to be set is a one applied to its associated EXCL OR gate. The other input to that EXCL OR gate is a zero because all the signals AL, Y0, Y1, Y2 and CIO, are all ones. With a one input and a zero input, the EXCL OR gate of the bit to be set in the destination produces a one output on its respective lead DB0, DB1, DB2, or DB3 in the data and control bus 25. This assures that the bit in the selected bit position of the destination is set to one whether or not it was a one when the set bit operation was commenced. The rest of the data bus lines will be the same as the bits stored in register TA. Simultaneously, the address of the destination and a write signal are applied to memory 22 of FIG. 1 for writing the now modified destination word into the selected destination and ending the instruction interval.

The control circuit 30 then steps to state 0-1, the final state for executing the set bit instruction. Thereafter the machine steps to state 0-3 commencing another instruction.

CLEAR BIT OPERATION—(REGISTER-DECODER G)

For the clear bit operation, the appropriate numerical opcode, represented by hexadecimal numeral A, is fetched from ROM 24 through bus 25 and is stored in the instruction register 32 during state 0-3. The control circuit 30 steps from state 0-3 through states 0-4 and 1-5 initiating the instruction interval by fetching address mode information and the order field bits N1, N0 for storage, respectively, in registers D/S and TAB. Subsequently the destination address is formed in state 1-E/F. Then the machine steps through state 3-9 following which the destination word is fetched and stored in register TA during state 2-4.

The microcomputer now is ready for the clear bit operation, and the arithmetic logic unit 20 is turned on to perform the single operation. The destination word in register TA is positioned to have a bit in the position, defined by the order field of bits N1 and N0, cleared if it is not already a zero.

Accordingly control signals are established and applied to the move bit control circuit 45 of FIGS. 1 and 7. Control signals for the clear bit operation are shown in the third row of TABLE I in FIG. 8. During the clear bit operation, inverted clear bit control signal $\overline{CB}$ is a zero insuring that the control signal GC, produced by NAND gate 92, is a one. Also the set bit control signal SB is a zero insuring that the control signal HC, produced by NOR gate 91, is a one. As a result both of the control signals HC and GC are ones for the clear bit operation.

Because the control signal HC is a one for the clear bit operation, all of the set bit group of signals H0, H1, H2 and H3 from the NOR gates of the controlled register-decoder H are zeros regardless of what bit is being selected in the destination word, as shown in the top row of TABLE II in FIG. 8. In accordance with a similar array of the set bit group of signals for regular ALU operations, these signals do not affect the output of the level of OR gates 42 in the ALU.

It is noted that because its output does not affect clear bit operations, the controlled-register decoder H is not needed for a computer which is performing clear bit operations but not set bit or move bit operations.

Because control signal GC is a one for the clear bit operation, the binary value of the order field of bits N0 and N1 defines which bit is to be cleared. This relationship is presented in the four lower rows of TABLE III in FIG. 8. The NAND gates of the controlled register-decoder G convert the applied binary value into a one-out-of-four code in the clear bit group of signals G0, G1, G2 and G3. In this code one and only one of the four output signals G0, G1, G2 and G3 is a zero and the others are ones for each of the binary values. The bit to be cleared, as defined by the order field of bits N1 and N0, is the zero.

As shown in FIGS. 2, 3 and 4, except for the bit to be cleared, the gates 61, 62, 63 and 64 of the level of AND gates 40 in the ALU respond to the word stored in register TA because three of the clear bit group of signals from the controlled register-decoder G are ones. Thus three of the AND gates 61, 62, 63 and 64 produce outputs corresponding to inputs from register TA. For the clear bit operation, the contents of register TB do not affect the output of the ALU. The output of the AND gate, associated with the selected bit to be cleared and defined by the order field of bits N1 and N0, corresponds with the zero output from the controlled register-decoder G.

The output of the corresponding OR gate 42 also is a zero which is applied as an input $\overline{Xi}$ to the associated AND gate 44 together with an input Yi from a NOR gate 46. This input $\overline{Xi}$ equal to zero causes the AND gate 44 to produce a zero output. This zero, representing the bit to be cleared, is in turn applied to the EXCL OR gate 48 together with a zero caused by the signals AL, Y0, Y1, Y2 and CIO being all ones. Both inputs to the EXCL OR gate 48 being zeros cause that gate to apply a zero output on the respective lead DB0, DB1, DB2 or DB3 of the data and control bus 25 in the bit position to be cleared in the destination. This output of the ALU 20 is a zero whether or not it was a zero in the word originally stored in register TA. This assures that the bit in the selected bit position of the destination is cleared to zero whether or not it was a zero when the clear bit operation was commenced. The rest of the data bus leads will be the same as the corresponding bits of the word stored in register TA. Simultaneously the address and the write signal are applied to the memory 22 of FIG. 1, for writing the now modified destination word into the selected destination and ending the instruction interval. The control circuit 30 steps on to state 0-1, the final state for executing the clear bit instruction. The microcomputer then steps to state 0-3 to commence another instruction.

MOVE BIT OPERATION
(REGISTER-DECODERS G AND H)

With the arrangement of the block diagram of FIG. 1, a single instruction interval is used for moving a single bit from any selected one of a plurality of bit positions in a selected source to any selected bit position of a plurality of bit positions in a selected destination. Other bits of the destination are not affected. The source and the destination may be the same or different memory locations. Also the source and destination bit positions may be the same or different.

There are two significant kinds of circuit operations for the move bit operation. The first kind of operation involves moving a one bit while the other involves moving a zero bit. Two examples follow for illustrating these two kinds of operations. In each example, the move bit instruction is described as a double opcode instruction. A more complete description of a machine operating with a double opcode is presented in the aforementioned Blahut et al patent. Using the double opcode instruction for controlling the move bit operation rather than using a single opcode instruction for controlling the move bit operation is a matter of design choice.

In the first example, consider an instruction for moving a bit selected from bit position No. 1 of a selected source to a selected bit position No. 2 of a selected destination. Assume that the word L in the selected source is 0110 and that the word M in the selected destination is 1011. Thus a one bit from word L is to be moved to a bit position presently storing a zero bit in word M.

During state 0-3 of a move bit operation as shown in FIG. 6, a first opcode, represented by hexadecimal numeral D, is fetched from memory via the data and control bus 25 and is stored in the instruction register 32. The control circuit 30 steps from state 0-3 to state 0-4, fetching address mode information through the bus 25 into register D/S and setting a flip-flop M/D to indicate that the instruction is a double opcode instruction.

Because the move bit instruction has set the flip-flop M/D but has only once passed through state 0-4, the microcomputer control steps from state 0-4 back to state 0-3 for fetching a second opcode from memory 24 through the bus 25 into the instruction register 32 replacing the first opcode word. This fetch of the second opcode for the move bit instruction and represented by hexadecimal numeral F occurs before executing the move bit instruction. In response to information retained from the first opcode and information contained in the second opcode, the control circuit 30 steps through state 0-4 into state 1-5 initiating the instruction interval by fetching address mode information into the register D/S for selecting source and destination addresses and data into the register TAB for determining the selected bit position. The word stored in register TAB includes information representing the selected bit position of the source and the selected bit position of the destination. Two of the bits, S1 and S0 stored in register TAB represent the order, or bit position, of the selected source bit. Two other bits, the order field of bits, N1 and N0 represent the order, or bit position, of the selected destination bit to be cleared or set. For the current example, bits S1 and S0 are 01 representing bit position No. 1 in the source and bits N1 and N0 are 10 representing bit position No. 2 in the destination. The control circuit steps on to state 1-E/F.

In state 1-E/F, source and destination addresses are formed from the information being stored in register D/S. Thereafter during states 3-9 and 2-4, source and destination words L and M are fetched from memory and are stored in registers TB and TA, respectively. This fetching operation does not affect the words stored in either the source or the destination.

At this time, as shown in FIG. 1 and FIG. 7, control signals are established and applied to the move bit control circuit 45. Bits S1 and S0 are transferred through a multiplexer 50 and are applied as control signals to the bit selection circuit 34. Simultaneously the word L from register TB is applied by way of bus 36 to the inputs B0, B1, B2 and B3 of the bit selection circuit 34, which is a one-out-of four selector. The bits S1 and S0 determine which bit of the four-bit word L is transferred through the selection circuit 34 to its output, as the inverted bit selection signal $\overline{BS}$. Because the selected bit B1 in position No. 1 is a one and because the bit selection circuit 34 inverts the selected bit signal, the inverted bit selected signal $\overline{BS}$ is a zero. Control signals for the move bit operation when moving a one bit are shown in the fifth row of TABLE I in FIG. 8.

The two other bits N1 and N0 stored in the register TAB determine the order, or bit position, of the selected destination bit as they do for set bit and clear bit instructions. Bits N1 and N0 are applied to the controlled register-decoders G and H in the move bit control circuit 45 to determine the pattern of output signals therefrom depending upon the state of the control signals GC and HC. Since the selected bit position in the destination is bit position No. 2, the order field of bits N1 and N0 is 10.

As shown in FIGS. 1 and 7, a NOR gate 90 having inputs $\overline{BS}$ and $\overline{MB}$, which are both low, produces an output bit selected signal OBS equal to one. This one, applied to the NOR gate 91, causes the control signal HC to be a zero. At the same time, because the inverted move bit signal $\overline{MB}$ is low, control signal GC equals one at the output of the NAND gate 92.

With the control signal GC equal to one and the order field of bits N1 and N0 in state 10, the clear bit set of signals G0, G1, G2, G3 from the NAND gates of the controlled register-decoder G of FIG. 6 is 1011, as shown in the fourth row of TABLE III in FIG. 8. Thus the relevant bit in bit position No. 2 at the output of the register-decoder G is a zero. This zero is applied to the appropriate AND gate 62 in the level of AND gates 40 in the ALU 20. The three ones are applied to the remaining AND gates 61, 63 and 64 of that level so that the outputs of those three AND gates are determined by the appropriate bits of the destination word stored in register TA.

Since the control signal HC equals zero and the order field of bits N1 and N0 is in state 10, the set bit group of signals H0, H1, H2, H3 from the NOR gates of the controlled register-decoder H of FIG. 7 is 0100, as shown in the fourth row of TABLE II. Thus the relevant bit in bit position No. 2 at the output of the controlled register-decoder H is a one, which is applied to the appropriate OR gate 42 in the ALU. The microcomputer now is prepared for the ALU 20 to perform the move bit operation. The control circuit 30 steps to state 2-0 and turns on the ALU 20.

As a result of the outputs of the controlled register-decoders G and H, the ALU circuits 62 and 42 both clear the bit in bit position No. 2 and set the bit in bit position No. 2 of the word presently being stored in register TA. An analysis of the logic of the arithmetic logic unit will show that the OR gate 42 for setting the bit is a later level of logic than the AND gate 62 for clearing the bit. As a result setting the bit overrides clearing the bit. In the example, the bit in bit position No. 2 is cleared by the zero of signal G2 and then is set by the one of signal H2. The output signals from other bit positions of the controlled register-decoders G and H do not affect the respective bits stored in register TA. As a result the output of the arithmetic logic unit applied to the data bus is 1111. Simultaneously, the destination address and the write signal are applied to the memory 22 in FIG. 1 for writing the modified output word from the ALU into the destination and ending the instruction interval. The control circuit 30 steps on to state 0-1, the final state in the execution of the move bit instruction. From state 0-1 the machine steps to state 0-3 the first state of another instruction. Thus a single bit from a selected bit position in the source has been moved to a selected bit position of the destination during a single instruction interval without affecting the state of any other bit position of the destination. If the source is a location other than the destination, the write operation does not affect the contents of the source.

An example demonstrating movement of a one bit to a bit position presently storing a one bit is similar to the foregoing example and therefore is discussed no further.

For a second example of a move bit instruction, we will discuss moving a zero bit from the word L to a bit position in word M where a one has been stored. In this example consider moving the bit selected from bit position No. 3 of a selected word L that is in state 0110 to a selected bit position No. 2 of a selected word M in state 1110.

When the move bit instruction is read out of memory, first and second opcodes are transferred to the instruction register as in the prior example. Additionally, the order of the bit to be moved from the source word and the order of the bit to be affected in the destination word are stored in the register TAB. Bits S1 and S0 are in state 11 representing the binary value of the order three of the bit to be moved from the source word. The order field of bits N1 and N0 is in state 10 representing the binary value of the order two of the affected bit in the selected destination word.

During the instruction interval, destination and source words M and L are stored in the registers TA and TB, respectively. The destination and source words in storage are not affected by the fetches. Register TA thus receives the destination word 1110 and register TB receives the source word 0110. The contents 0110 of the register TB are applied as the inputs B0, B1, B2 and B3 to the bit selector 34 of FIG. 6. Selection is controlled by bits S1 and S0 which are applied to the bit selector 34 from the register TAB by way of the 4:2 multiplexer 50. Since bits S1 and S0 are 11, the zero bit in position three from the word 0110 is selected. Selector 34 inverts the zero into the inverted bit selected signal $\overline{BS}$ producing a one. Control signals for the move bit operation when moving a zero bit are shown in the fourth row of TABLE I in FIG. 8.

At this time, inverted move bit signal $\overline{MB}$ and set bit signal SB are both zeros. Thus the control signal HC produced by NOR gate 91 is a one and the output of the NOR gates of the register-decoder H in FIGS. 1 and 7 is all zeros, as shown in the top row of TABLE II in FIG. 8. Also since this is a move bit instruction, the control signal GC produced by the NAND gate 92 is a one. Output of the NAND gates of the register-decoder G in FIGS. 1 and 7 is controlled by the order field of bits N1 and N0 from the register TAB. The binary value 10 thereof causes the output of the controlled register-decoder G to be 1011, as shown in the fourth row of TABLE III in FIG. 8. A zero thus appears in the order of the bit to be affected in the destination word. The microcomputer now is prepared for ALU 20 to perform the move bit operation.

During state 2-0 while the ALU is turned on, the destination word 1110 from the register TA is processed through the arithmetic logic unit 20. Bit position No. 2 is cleared by the zero signal G3 from the controlled register-decoder G and remains clear as a result of the set bit group of signals H0, H1, H2, H3 from controlled register-decoder H being all zeros. As a result the output of the arithmetic logic unit 20 is 1010 and is applied to the data and control bus 25. Simultaneously, the destination address and the write signal are applied to the memory 22 for writing the modified output word from the ALU into the destination and ending the instruction interval. If the source is a location other than the destination, the source word is not affected by the write operation.

The control circuit 30 steps on to state 0-1, the final state for executing the move bit instruction, and thence to state 0-3 the initial state of a subsequent instruction. Thus a single bit from a selected bit position in the selected source has been moved to a selected bit position in the selected destination during a single instruction interval without affecting the state of any other bit of the destination.

An exxample demonstrating movement of a zero bit from the source to a bit position presently storing a zero bit in the destination is similar to the just described example and therefore is discussed no further.

In summary, a move bit instruction in essence performs both a clear bit operation and a set bit operation. Because the set bit leads H0, H1, H2, H3 from the register-decoder H of FIG. 7 are wired into a later level of logic in the ALU 20 of FIGS. 2, 3 and 4 than where leads G0, G1, G2, G3 are wired, the total operation effectively is like first performing the clear bit operation and then performing the set bit operation when a bit is to be set.

An all zeros output of controlled register-decoder H does not override the clearing of any bit position within the arithmetic logic unit. The decoding accomplished by the bit selector 34 determines whether or not the controlled register-decoder H produces an output to override the clearing of some bit which is accomplished by the output of the controlled register-decoder G.

Thus there has been described an arithmetic logic unit arranged to clear a bit, set a bit or move a bit in a single instruction interval.

We claim:

1. A digital computer comprising
an instruction register;
a source of data;
an arithmetic logic unit;
a destination;
means for processing data from the source through the arithmetic logic unit and storing a result of the processing in the destination in response to instructions residing sequentially in the instruction register, each instruction requiring a single instruction interval for fetching data from a selected source in a store to an input of the arithmetic logic unit, processing the fetched data in the arithmetic logic unit, and storing the result of processing the fetched data into a selected destination in the store; and means interconnecting with the selected source, the arithmetic logic unit and the selected destination and being responsive to a move bit instruction residing in the instruction register for moving a single bit from any selected one of a plurality of bit positions in the selected source only once through the arithmetic logic unit to any selected bit position of a plurality of bit positions in the selected destination during a single instruction interval without affecting the state of any other bit of the selected destination.

2. A digital computer arranged for moving a bit from any selected one of a plurality of bit positions in a selected source to any prescribed bit position in a selected destination, the computer comprising
circuit means for selecting a predetermined bit from the selected source and producing a signal representing the state of the predetermined bit,
an instruction register,
a control circuit,
an arithmetic logic unit arranged to operate in response to signals from the control circuit and the instruction register for transferring only once a data word from an input of the arithmetic logic unit to the selected destination,
a first controlled register-decoder circuit means connected into the arithmetic logic unit for clearing the prescribed bit position without affecting the state of any other bit in the data word being transferred to the selected destination, and
a second controlled register-decoder circuit means connected into the arithmetic logic unit and responsive to the signal representing the state of the predetermined bit for selectively setting the prescribed bit position without affecting the state of any other bit in the data word being transferred to the selected destination, the computer being arranged to move the predetermined bit from the selected source to the prescribed bit position in the selected destination during a single instruction interval.

3. A digital computer arranged for moving a bit from any selected one of a plurality of bit positions in a selected source to any prescribed bit position in a selected destination, the computer comprising
circuit means for selecting a predetermined bit from the selected source and producing a signal representing the state of the predetermined bit,
an instruction register,
a control circuit,
an arithmetic logic unit arranged to operate in response to signals from the control circuit and information stored in the instruction register for transferring only once a data word from an input of the arithmetic logic unit to the selected destination,
a first controlled register-decoder circuit means connected into the arithmetic logic unit for clearing the prescribed bit position without affecting the state of any other bit in the data word being transferred to the selected destination, and
a second controlled register-decoder circuit means connected into the arithmetic logic unit and responsive to the signal representing the state of the selected bit for selectively allowing the prescribed bit position to remain cleared without affecting the state of any other bit in the data word being transferred to the selected destination, the computer being arranged to move the predetermined bit from the selected source to the prescribed bit position in the selected destination during a single instruction interval.

4. A digital computer arranged for moving a bit from any selected one of a plurality of bit positions in a selected source to any selected one of a plurality of bit positions in a selected destination, the computer comprising circuit means for selecting a predetermined bit from the selected source and producing a signal representing the state of the predetermined bit, an instruction register, a control circuit, an arithmetic logic unit arranged to operate in response to signals from the control circuit and information stored in the instruction register for transferring once a data word from an input of the arithmetic logic unit to the selected destination, a first controlled register-decoder circuit means connected into the arithmetic logic unit for clearing a prescribed bit position in the data word being transferred to the selected destination without affecting the state of any other bit position in the data word being transferred to the selected destination, and a second controlled register-decoder circuit connected into the arithmetic logic unit and responsive to the signal representing the state of the predetermined bit for allowing the prescribed bit position in the data word being transferred to remain cleared when the signal representing the predetermined bit is a zero and for setting the prescribed bit position in the data word being transferred when the signal representing the predetermined bit is a one without affecting the state of any other bit in the data word being transferred to the selected destination, the computer being arranged to move the predetermined bit from the selected source to the prescribed bit position in the selected destination during a single instruction interval.

5. An arithmetic logic unit including a level of AND gates and a level of OR gates for transferring a destination word unaltered from a register through the levels of gates to a data bus and a destination, the unit comprising a circuit for selecting a bit from a source word, a circuit responsive to the selected bit, a control field of bits, and an order field of bits representing a predetermined bit position of the destination word for producing concurrently a clear bit group of signals and a set bit group of signals, and means for applying concurrently the clear bit group of signals to the level of AND gates and the set bit group of signals to the level of OR gates for altering the state of the bit in the predetermined bit position of the destination word in correspondence with the state of the selected bit from the source word without affecting the state of any other bit of the destination word.

6. An arithmetic logic unit comprising a level of OR gates arranged for transferring a selected destination word from an input of the arrangement through the OR gates and a data bus to the selected destination with a predetermined bit of the selected destination word to be set, an instruction register;

first and second temporary registers;

means for fetching a single instruction including an opcode word to be stored in the instruction register, address information for the selected destination, and a bit position field to be stored in the first temporary register;

means for fetching the selected destination word into the second temporary register;

means responsive to the opcode word stored in the instruction register for producing a control signal;

a controlled register-decoder responsive to the control signal and the bit position field for generating a set bit code word; and means for applying the selected destination word from the second temporary register to the level of OR gates and the set bit code word directly to the level of OR gates for producing the selected destination word with the predetermined bit set and all other bits not affected within a single instruction interval.

7. An arithmetic logic unit comprising a level of AND gates arranged for transferring a selected destination word from an input of the arrangement through the AND gates and a data bus to the selected destination with a predetermined bit of the selected destination word to be cleared, an instruction register;

first and second temporary registers;

means for fetching a single instruction including an opcode word to be stored in the instruction register, address information for the selected destination, and a bit position field to be stored in a first temporary register;

means for fetching the selected destination word into a second temporary register;

means responsive to the opcode word stored in the instruction register for producing a control signal;

a controlled register-decoder responsive to the control signal and the bit position field for generating a clear bit code word; and means for applying the selected destination word from the second temporary register and the clear bit code word directly to the level of AND gates for producing the selected destination word with the predetermined bit cleared and all other bits not affected within a single instruction interval.

8. A digital computer arranged to process data from a source through an arithmetic logic unit to a destination in response to basic instructions stored in the computer, the computer comprising means interconnected with the source, the arithmetic logic unit, and the destination for effecting each basic instruction during a single basic instruction interval, each single basic instruction interval including time for fetching data from the source, processing the data only once through the arithmetic logic unit, and storing the result of processing the data into the destination, and means interconnecting with the source, the arithmetic logic unit, and the destination for effecting a move bit operation in response to a move bit instruction, the move bit operation being effected during a period corresponding to a single basic instruction interval.

* * * * *